(12) United States Patent
Havenstein et al.

(10) Patent No.: US 6,688,004 B2
(45) Date of Patent: Feb. 10, 2004

(54) LINE-OF-CUT INDICATOR FOR A CUTTING TOOL

(75) Inventors: Guillermo Havenstein, Zorneding (DE); Jorge L. Plana, Chicago, IL (US); Mark Miklosz, Western Springs, IL (US); William H. Schultz, North Brook, IL (US)

(73) Assignee: S-B Power Tool Company, Chicago, IL (US)

( * ) Notice: Subject to any disclaimer, the term of this patent is extended or adjusted under 35 U.S.C. 154(b) by 0 days.

(21) Appl. No.: 09/893,832

(22) Filed: Jun. 28, 2001

(65) Prior Publication Data

US 2003/0000091 A1 Jan. 2, 2003

(51) Int. Cl.[7] ............................................... B23D 47/02
(52) U.S. Cl. ........................................ 30/374; 30/391
(58) Field of Search .................... 30/290, 375, 376, 30/374, 390, 391

(56) References Cited

U.S. PATENT DOCUMENTS

| | | | |
|---|---|---|---|
| 4,589,208 A | 5/1986 | Iwasaki et al. | |
| 4,833,782 A | 5/1989 | Smith | |
| 5,811,784 A | * 9/1998 | Tausch et al. | 144/136.95 |
| 5,881,784 A | * 3/1999 | Morikawa | 144/136.95 |
| 5,924,207 A | 7/1999 | Price et al. | |

* cited by examiner

*Primary Examiner*—Douglas D. Watts
(74) *Attorney, Agent, or Firm*—Gardner Carton & Douglas LLP

(57) ABSTRACT

A line-of-cut indicator for use with a cutting tool including a pointer element that may be moved between an open position substantially in front of the footplate of the cutting tool and a closed position substantially behind the front of the footplate of the cutting tool. The pointer element may be moved between the open and closed positions by rotating or sliding. The pointer element may provide one or multiple reference points for the line-of-cut.

26 Claims, 3 Drawing Sheets

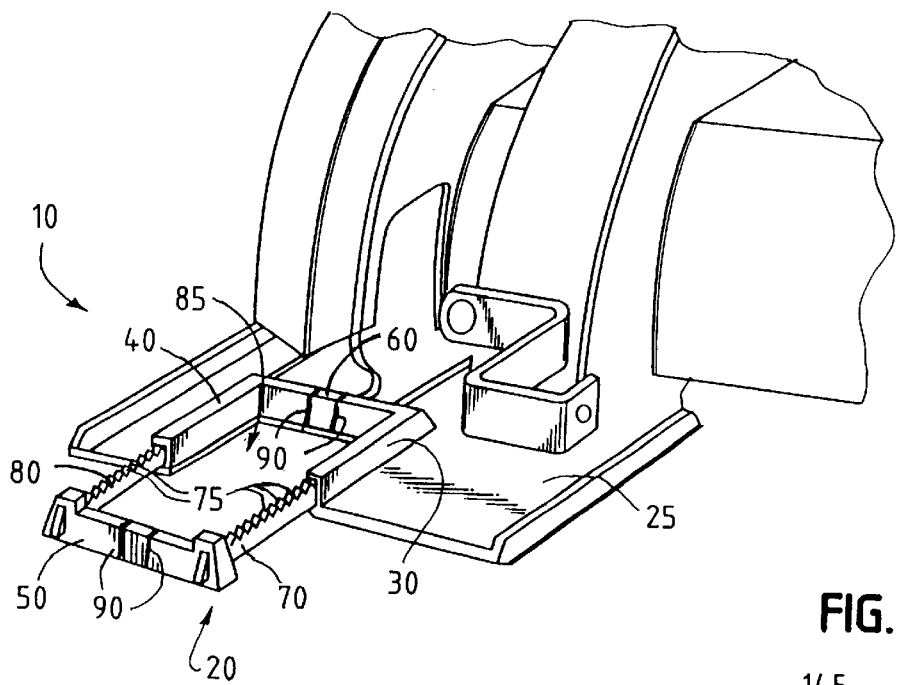
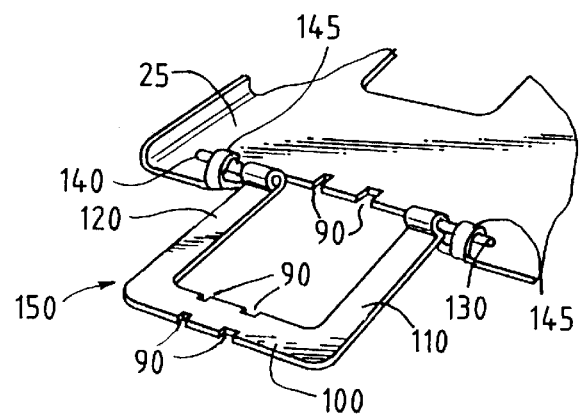
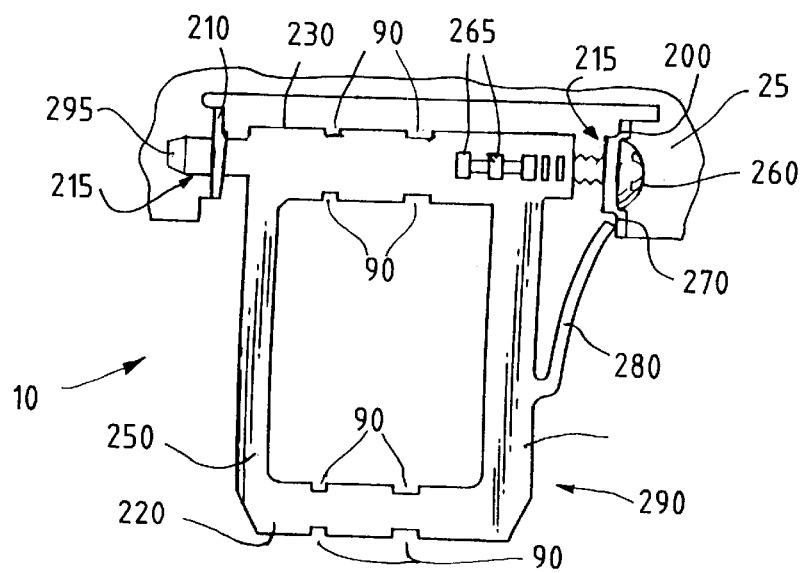

LINE-OF-CUT INDICATOR FOR A CUTTING TOOL

FIELD OF THE INVENTION

The present invention relates generally to a line-of-cut indicator for use with a cutting tool, and more specifically, to a line-of-cut indicator having a pointer assembly attached to the footplate of a cutting tool whereby the pointer assembly can rotate or slide between an open and closed position.

BACKGROUND OF THE INVENTION

Indicators for use with cutting tools, such as circular saws, jig saws, miter saws and others, provide a user with a reference point that is located in front of the blade of a cutting tool. This reference point generally serves as a guide for the user to position and move the blade along a particular desired line of cut on the workpiece. Most prior art cut indicators provide the user with only a single reference point with which to make the cut, such that the user is unaware if the blade is properly aligned.

The prior art proposes various line-of-cut indicators. For example, U.S. Pat. No. 5,924,207 to Price et al. discloses a hand-held circular saw having a window assembly on its base to indicate the position of the saw blade with respect to a reference line on a workpiece. U.S. Pat. No. 5,881,784 to Morikawa et al. discloses a biscuit cutter having an adjustable fence having an aperture with a center line mark to assist in alignment during a cutting operation. In addition, U.S. Pat. No. 4,589,208 to Iwasaki et al. and U.S. Pat. No. 4,450,627 disclose stationary line of cut indiators that provide only a single reference point along a reference line marked on a workpiece. Except for the device of Morikawa et al., each of these prior art devices teaches a stationary reference indicator. The Morikawa et al. device teaches hingedly attaching an alignment mechanism through a simple hinge which serves to maintain the alignment plate in its downward position using a knob which is manually tightened against the plate. Thus, one important drawback of such prior art devices is that, particularly for the devices that are directed to alignment mechanisms that protrude beyond the front of the tool, if the tool is inadvertently hit or jarred against a workpiece, there is a possibility that the alignment mechanism will get broken or damaged.

There are also other disadvantages to such prior art designs. For instance, in one example the window assembly is located on the footplate, just in front of the blade. As a result, the user must lean over the blade to have a clear view of the workpiece through the window assembly. In other words, a short line of sight for viewing the cut exists. Furthermore, the window assembly is not removable for use with other cutting tools and requires a shoe to have an opening therethrough, so its use is limited to hand-held circular saws having an opening in the shoe of the saw.

What is needed is a line-of-cut indicator that is able to conveniently move between an open and a closed position, such as by rotating or sliding, so as not to break off or get damaged in the event it is inadvertently hit with a workpiece. What is also needed is such a line-of-cut indicator that provides at least two points of reference for the user, thus providing a better accuracy for alignment of the cut. Furthermore, what is needed is a line-of-cut indicator that extends past the front of the footplate of the cutting tool and thereby reduces the need for the user to lean over the cutting tool to view the line-of-cut thereby substantially increasing safety and aligned cutting accuracy.

SUMMARY OF THE INVENTION

The present invention satisfies the foregoing and overcomes the deficiencies of the prior art. The present invention provides a line-of-cut indicator that is attached to the footplate for use with a variety of cutting tools and allows for easier adjustment thereof.

The present invention reduces the risk of breakage or damage to the indicator by providing a line-of-cut indicator that rotates or slides from an opened to a closed position such that, in the event the indicator comes into contact with a foreign object or a part of a workpiece, the indicator will move to its closed and more protected position, without breaking or damaging the indicator.

The present invention also improves cutting accuracy by extending the line-of-cut marking beyond the front edge of the footplate. Furthermore, accuracy is improved by providing at least two points of reference with the line-of-cut indicator of the present invention.

According to the present invention, provided herein is a line-of-cut indicator for use with a cutting tool having an indicator assembly attached to a footplate of a cutting tool. According to one embodiment, the indicator of the present invention preferably has at least two points of reference for guiding a line of cut. The indicator is also adapted to be rotatably or slidably attached to the footplate.

BRIEF DESCRIPTION OF THE DRAWINGS

The above advantages, features and aspects of the present invention are readily apparent from the following detailed description, appended claims and accompanying drawings, in which:

FIG. 1 is a perspective view of a slidable line-of-cut indicator attached to a footplate made in accordance with one embodiment of the present invention;

FIG. 2 is a perspective view of a rotatable line-of-cut indicator attached to a footplate according to another embodiment of the present invention;

FIG. 3 is a top view of a rotatable cam-action line-of-cut indicator attached to a footplate according to another embodiment of the present invention;

Figure 4:
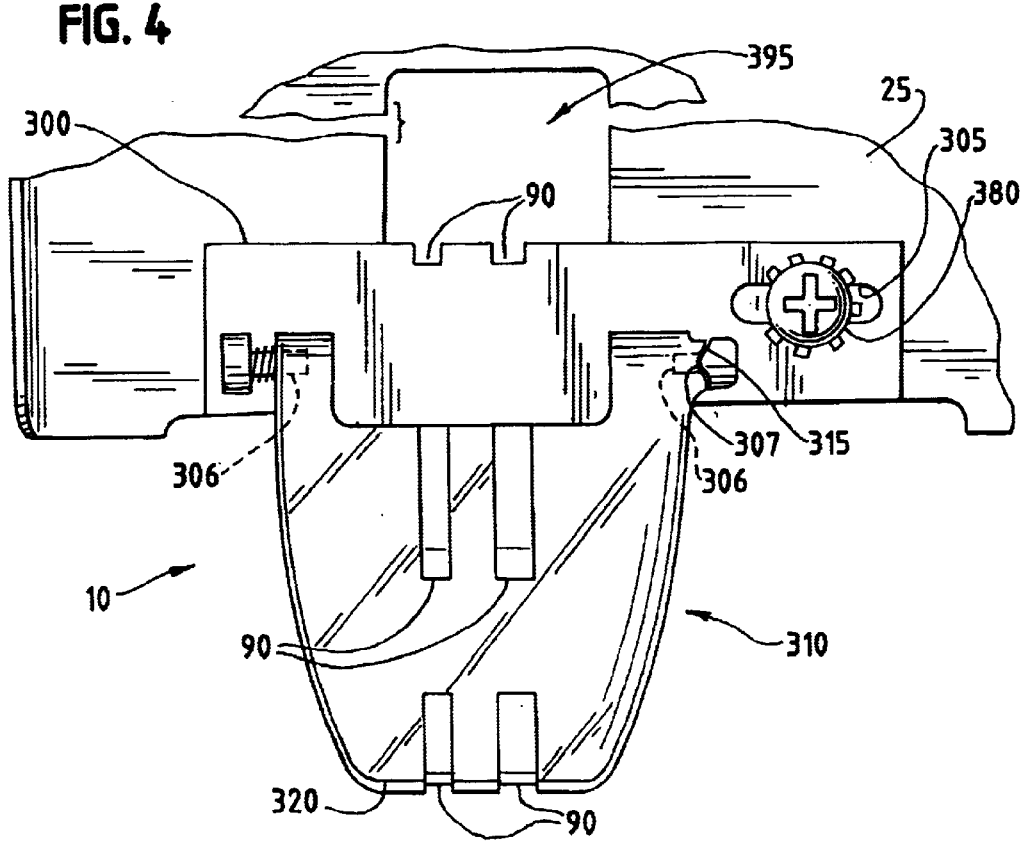
FIG. 4 is a top view in an open position of a clear rotatable cam-action line-of-cut indicator having a base attached to a footplate according to another embodiment of the present invention.

While the invention is susceptible to various modifications and alternative forms, certain preferred embodiments are shown by way of example in the drawings and will herein be described in detail. It should be understood, however, that it is not intended to limit the invention to the particular forms described, but to the contrary, the invention is intended to cover all modifications, alternatives and equivalents falling within the spirit and scope of the invention as defined by the appended claims.

DETAILED DESCRIPTION OF THE INVENTION

Turning first to FIG. 1, there is illustrated, in accordance with a first embodiment of the present invention, a line-ofcut indicator assembly 10 provided on the footplate 25 of a cutting tool. According to this embodiment of the invention, the indicator assembly 10 is comprised of a generally transversely extending back rail 60, a generally longitudinally extending first side rail 30 and a generally longitudinally extending second side rail 40, all of which are attached to the footplate 25 thereby forming a generally U-shaped opening 85 in the footplate 25. In addition, the indicator assembly 10 includes a pointer frame assembly 20 comprised of a generally transversely extending front member 50, a generally longitudinally extending first side segment 70 and a generally longitudinally extending second side segment 80, which together form a generally U-shaped configuration complementary to that formed from the rails 60, 30 and 40. The pointer frame assembly 20 is disposed such that first and second side segments 70, 80 slide into the first and second side rails 30, 40, respectively. Furthermore, the first and second side segments 70, 80 may be provided with teeth 75 on the upper part of the segments 70, 80 for guiding and locking within the first and second side rails 30, 40 respectively, which rails 30, 40 may be provided with complementary teeth, projection of other element to engage teeth 75 to retain the first and second side segments 70,80 in a particular position. The back rail 60 and the front member 50 may be provided with guide marks 90 to provide at least two points of reference for aligning a workpiece having a marked cutting line prior to and during the use of a cutting tool. By sliding the pointer frame 20 in and out of the side rails 30 and 40, the pointer frame 20 may be moved from a completely extended position where the front member 50 is disposed farthest from the footplate 25 (extending beyond the front of the footplate 25 approximately the length of the side rails 30 and 40), to a completely retracted position where the front member 50 is substantially adjacent to the front of the footplate 25. Preferably, the pointer frame 20 will be disposed so as to slide generally parallel to the plane of the footplate 25 and in the same plane as the footplate 25, as illustrated, so that the indicator assembly 10 is disposed close to or adjacent to a marked cut line of a workpiece. The indicator assembly 10 may be fabricated from metal or plastic or similar materials. One important aspect of the present invention over the prior art, is that when the pointer frame assembly 20 is accidentally hit against a workpiece or other object (such as might happen during initial alignment with a workpiece for a cutting operation), instead of being damaged or broken, the pointer assembly 20 will slide from its extended to its retracted position.

Turning now to FIG. 2, there is illustrated another embodiment of the present invention. According to that embodiment, there is provided a line-of-cut indicator assembly 10 comprised of a generally U-shaped pointer frame 150 provided on a footplate 25 of a cutting tool. The U-shaped pointer frame 150 has a generally transversely extending top member 100, a generally longitudinally extending first side member 110 and a generally longitudinally extending second side member 120. The top and side members 100, 110, 120 may be fabricated from a single material, such as a stamped metal plate, as illustrated, or molded piece of plastic, or the members may be individually fabricated and joined together. In accordance with the invention, U-shaped pointer frame assembly 150 is hingedly attached to the footplate 25. As illustrated by way of example, the hinged attachment may be accomplished with a pair of pins 130, 140 extending from the side members 110, 120 and which are engaged for rotational movement by generally U-shaped retention members 145 attached to the footplate 25. As can be seen, the U-shaped pointer frame 150 is rotatable with respect to the pins 130, 140 and may be rotated to an extended position (as illustrated) where the the frame lies substantially in the same plane as the footplate and may be rotated to a retracted position where the pointer frame 150 is folded back on top of the footplate 25. Preferably, the top member 100 and the footplate 25 are provided with guide marks 90 providing at least two points of reference when aligning the cutting tool with a marked cutting line of a workpiece. According to an aspect of the present invention, if the pointer frame 150 is hit or jarred when in its extended position, the point frame will rotate back to its retracted position, instead of being damaged or broken.

Another embodiment of the present invention is illustrated in FIG. 3 which includes a line-of-cut indicator assembly 10 having a footplate 25 and a pointer frame 290. The pointer frame 290 has a generally transversely extending top member 220 for use as a pointer, a generally longitudinally extending first side segment 240, a generally longitudinally extending second side segment 250 and a generally transversely extending bottom member 230. The generally planar footplate 25 has a first tab 200 having a cam surface 270 and a second tab 210. The tabs 200, 210 may be bent up from the footplate 25 (which may be fabricated from stamped steel), and each of the tabs 200, 210 have an opening 215 therethrough for reception of a pin 295 on one end and a screw 260 on the other end. The bottom member 230 of the pointer frame 290 may be provided with a plurality of fingers 265 to threadedly receive the screw 260. The pointer frame 290 is thereby rotatably attached to the footplate 25. The first side segment 240 is provided with an integrated leaf spring 280 that engages the cam surface 270 of the first tab 200. The integrated leaf spring 280 interacting with the cam surface 270, urges the pointer frame 290 to either an opened, unfolded position or a closed, folded position. Thus, in the event the pointer frame 290 is in an opened position and the pointer frame is jarred or hit by an object, the leaf spring 280 interacting with the cam surface 270 operates to urge the pointer frame 290 into a closed position where the frame 290 is maintained substantially adjacent to the footplate 25. As illustrated, the pointer frame assembly 290 may also be provided with a screw 260, the head of which may be maintained in contact with the tab 200 extending from the footplate 25. The leaf spring 280, in addition to promoting a camming action to maintain the pointer frame 290 in either an open or closed position, also urges the head of the screw 260 against the tab 200. Thus, by rotating the screw 260 with respect to the fingers 265 of the pointer frame 290 into which it is threaded, the position of the pointer frame 290 may be laterally adjusted with respect to the footplate 25 to ensure that the guide marks 90 on the pointer frame 290 are properly aligned. As illustrated, the top member 220 and bottom member 230 of the pointer frame 290 have guide marks 90 that provide at least two points of reference for aligning with respect to a marked cut line of a workpiece. While the pointer frame 290 may be fabricated from a variety of different materials, it may be preferable to fabricate the frame 290 from plastic. A plastic frame could be easily molded to provide the pin 295, the frame members 220, 230, 240 and 250, a leaf spring type element 280 as well as a plurality of fingers which may threadedly receive the screw 260.

Figure 5:
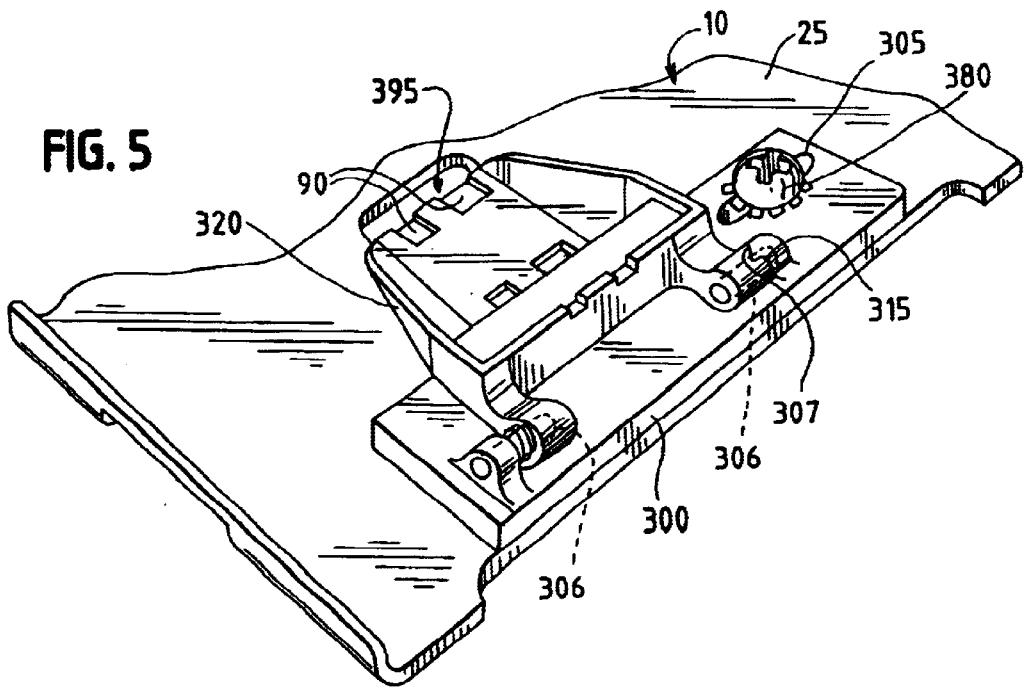
FIG. 5 is a perspective view of the clear rotatable cam-action line-of-cut indicator illustrated in FIG. 4 when the indicator is in its closed position.

FIGS. 4 and 5 illustrate another embodiment of the present invention providing a line-of-cut indicator assembly 10 having a pointer element 310 attached to a generally planar base 300 which is secured to a footplate 25 with, for example, a screw 380. As illustrated, the base 300 may be provided with bole 305 that is slotted, such that the lateral position of the pointer element 310 be adjusted within the distance allowed byte slot 305. The screw 380 may be tightened to maintain the assembly 10 at the desired lateral position. (Alternatively, there may be provided a pair of screws 380 each of which fits into a slot 305 in the base 300). The pointer element 310 be fabricated from clear plastic and has a top edge 320 and a bottom edge 330. The base 300 may be provided with a pin 306 having a camming surface 307 such that the pin fits into a recess of the pointer element 310 and the camming surface 307 of the base 300 interacts with a complementary camming surface 315 of the pointer element 310. On the other side of the pointer element, the base 300 contains another pin 306 that fits into a recess of the pointer element 310. Preferably, a compression spring 308 will be included on the pin between the base and the pointer element 310 to urge the camming surface 360 of the pointer element 310 spinet the camming surface 315 of the base 300. The compression spring 360 and the cam surfaces 307, 315 of the pointer element 310 and the base 340 act in concert, rotatably urging the pointer element 310 between either an open (FIG. 4) or a closed (FIG. 5) position. The top edge 320 and bottom edge 330 of the pointer element 310 have guide marks 90 for use as reference points. In addition, the base 300 has further guide marks 90 on both a front edge 385 and a rear edge 390 of the base 300. The pointer frame 310 maybe solid, made preferably of a transparent plastic, but maybe made of any other transparent material as well. Preferably, footplate 25 may also be provided with an opening 395 such that the pointer element 310 may also provide line of cut guidance in a closed position, because the marked cut line on the workpiece may seen from the opening with respect to the markings 90 on the pointer element 310. While in the open position, the two pairs of murkings 90 on the pointer element 310 as well as markings 90 on the base 395 provide at least 3 aligned points of reference for a cut. While in the closed position, the two pairs of markings 90 on the pointer element 310, which may be aligned with a marked cut line of a workpiece visible through the transparent pointer element 310 and the opening 395 in the footplate 25, provide at least two points of reference for a cut. In addition, even in the closed position, the markings 90 on the base 395 may be visible through the transparent pointer element 310 to provide another reference point. The arrangement where the pointer element 310 provides cutting alignment guidance in the closed position (FIG. 5) may be particularly useful when the cutting tool needs to be moved forward as close as possible to a vertical element that might impede farther cutting (such as into a corner). According to an advantageous feature of the invention, in the event the pointer element 310 is hit or jarred when in its open position, since it is rotatably attached and is urged with the camming arrangement 307, 315 between the pointer element 310 and the base 300, the pointer element 310 will simply flip back to the closed position, instead of getting damaged or broken.

Figure 6:
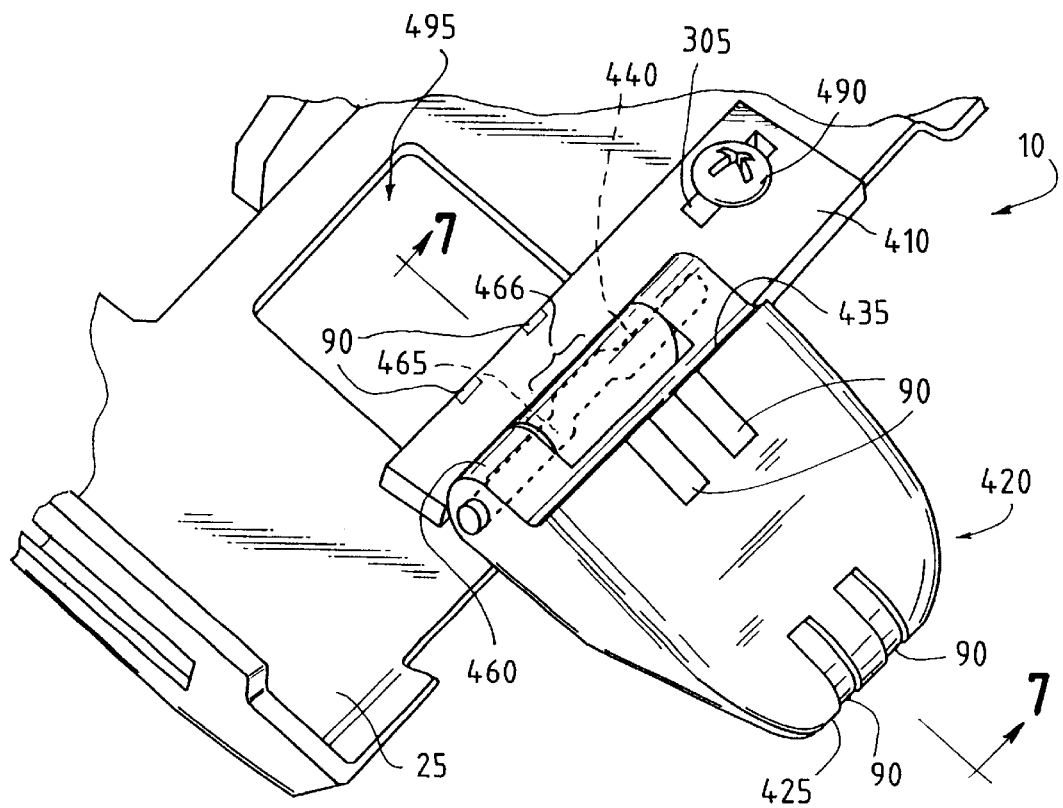
FIG. 6 is a perspective view of the clear rotatable cam-action line-of-cut indicator illustrated in FIG. 4 when the indicator is in its open position.
Figure 7:
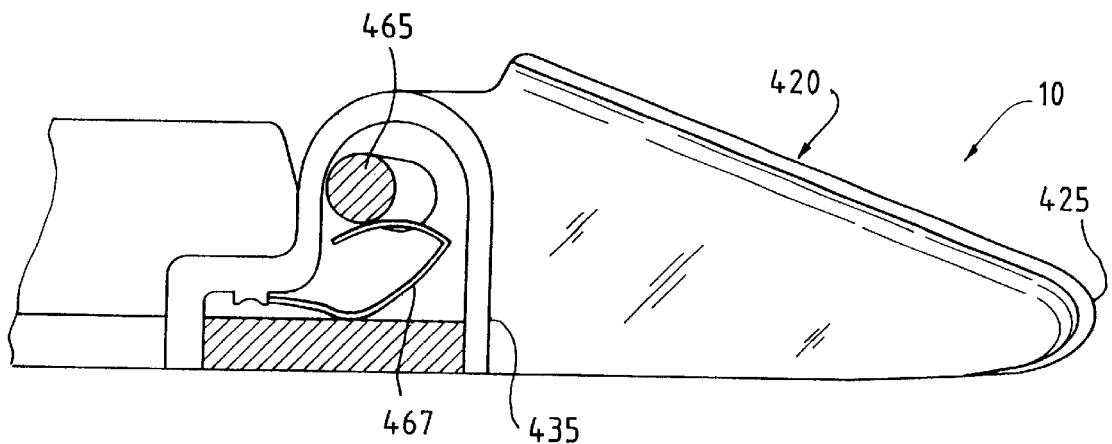
FIG. 7 is a side cut-away view of the clear rotatable cam-action line-of-cut indicator illustrated in FIG. 4 showing a camming feature of the indicator.

Another similar embodiment of the invention is illustrated in FIGS. 6 and 7 and provides a line-of-cut indicator 10 having a pointer element 420 rotatably attached to a base 410 that is secured to a footplate 25 at a desired lateral position with a screw 490 extending through a slot 305 in the base 410. The pointer element 420 has an upper edge 425 and a bottom edge 435, as well as a first side arm 450 and a second side arm 460. The base 410 has a raised hollow portion 440 that is secured between the first and second side arms 450, 460 of the pointer element 420. The first side arm 450, raised hollow portion 440 and second side arm 460 have an opening therethrough for receiving an axis pin 465 that rotatably attaches the first and second side pieces 450, 460 to the base 410. Preferably, the axis pin 465 includes an eccentric cam section 466 that interacts with a leaf spring 467 attached to the base 410 and which actuates normal to the pin axis to urge the pointer element 420 between either an open position or a closed position. The axis pin 465 extends in a generally transverse direction and, is secured to the pointer frame 420 in side arms 450, 460. The base 410 has a rectangular-shaped aperture 495, generally the same size as the pointer element 420, for receiving the pointer element 420 in the closed position. The pointer element 420 may be solid and may be fabricated of a transparent plastic material, although other materials known in the art may be used. Guide marks 90 are provided on both the upper edge 425 and the lower edge 435 of the pointer element 420, as well as the base 410.

As seen from the foregoing, the present invention provides several embodiments of a line-of-cut indicator assembly for a cutting tool. Advantageous for each embodiment is that the assembly extends beyond the front edge of the cutting tool and provides at least two points of reference for guiding and aligning the tool during a cutting operation. Further, features are disclosed for urging the indicator assembly between either an open position or a closed position. In addition, features are disclosed for providing a camming action for the indicator assembly such that if the assembly is jarred or hit while in an open position, the assembly will return to a closed position, thereby reducing the risk that the assembly will be broken or damaged.

What is claimed is:

1. A cutting tool having a footplate and a line-of-cut indicator, the line-of-cut indicator comprising:
    a pointer element having at least one line-of-cut reference point, the pointer element attached to the footplate for movement between an open position where the pointer element extends substantially beyond the front edge of the footplate and provides a first line-of-cut reference point, and a closed position where the pointer element extends substantially behind the front edge of the footplate and provides a second line-of-cut reference point, and the footplate comprises an opening for the second line-of-cut reference point.

2. A cutting tool in accordance with claim 1 wherein the pointer element has at least two line-of-cut reference points.

3. A cutting tool in accordance with claim 1 wherein the footplate includes at least one line-of-cut-reference point.

4. A cutting tool in accordance with claim 1 wherein the pointer element is rotatably attached to the footplate.

5. A cutting tool in accordance with claim 4 wherein the rotatable attachment of the pointer element to the footplate includes a camming feature such that the pointer element is urged between either the open position or the closed position.

6. A cutting tool in accordance with claim 5 wherein the camming feature is provided by a pointer element cam surface disposed on the pointer element that engages with a complementary footplate cam surface disposed on an element secured to the footplate.

7. A cutting tool in accordance with claim 6 further comprising a spring element that urges the pointer element cam surface into engagement with the footplate cam surface.

8. A cutting tool in accordance with claim 5 wherein the camming feature is provided by a generally tranversely extending axis pin which attaches the pointer element to the footplate for rotational movement, the axis pin including an eccentric section for providing the camming feature.

9. A cutting tool in accordance with claim 8 further comprising a leaf spring for engaging with the eccentric portion of the axis pin.

10. A line-of-cut indicator for use with a cutting tool comprising:
   a pointer element having at least one line-of-cut reference point,
   a hinge adapted to be mounted to the cutting tool for rotatably moving the pointer element with respect to the cutting tool between an open position where the pointer element extends substantially beyond the front of the cutting tool and a closed position where the pointer element extends substantially behind the front of the cutting tool, and
   a cam surface on the pointer element that engages with a complementary cam surface on the hinge, urging the pointer element between the open position and the closed position.

11. A line-of-cut indicator in accordance with claim 10 further comprising a spring for urging the painter element cam surface into engagement with the hinge cam surface.

12. A line-of-cut indicator in accordance with claim 10 wherein the hinge is comprised of an axis pin having an eccentric cam section that urges the pointer element between the open position and the closed position.

13. A line-of-cut indicator in accordance with claim 12 further comprising a spring attached between and engaging the pointer element and the eccentric cam section of the axis pin.

14. A line-of-cut indicator for use with a cutting tool comprising:
   pointer means having at least one line-of-cut reference point for indicating the line of cut with respect to the cutting line of the cutting tool,
   hinge means adapted to be mounted to the cutting tool for rotating the pointer means between an open position where the pointer element extends substantially beyond the front of the cutting tool and a closed position where the pointer element extends substantially behind the front of the cutting tool,
   a cam means for urging the pointer element between the open position and the closed position.

15. A line-of-cut indicator in accordance with claim 14 further comprising a spring means engaging the cam means.

16. A line-of-cut indicator in accordance with claim 14 wherein further comprising means for laterally adjusting the position of the pointer element with respect to the cutting tool.

17. A cutting tool having a footplate and a line-of-cut indicator, the line-of-cut indicator comprising:
   a substantially U-shaped frame having at least one line-of-cut reference point, the frame attached to the footplate for longitudinal movement between an open position where the frame extends substantially beyond the front edge of the footplate, and a closed position where the frame is substantially adjacent to the front edge of the footplate wherein the frame includes a plurality of teeth for engaging with a complementary element attached to the footplate to retain the frame in a desired position beyond the front edge of the footplate.

18. A cutting tool having a footplate and a line-of-cut indicator, the line-of-cut indicator comprising:
   a pointer element having at least one line-of-cut reference point, the pointer element attached to the footplate for movement between an open position where the pointer element extends substantially beyond the front edge of the footplate, and a closed position substantially 180 degrees from the open position, where the pointer element extends substantially behind the front edge of the footplate.

19. A cutting tool in accordance with claim 18 wherein the pointer element has at least two line-of-cut reference points.

20. A cutting tool in accordance with claim 18 wherein the footplate includes at least one line-of-cut-reference point.

21. A cutting tool in accordance with claim 18 wherein the pointer element is rotatably attached to the footplate.

22. A cutting tool in accordance with claim 21 wherein the rotatable attachment of the pointer element to the footplate includes a camming feature such that the pointer element is urged between either the open position or the closed position.

23. A cutting tool in accordance with claim 22 wherein the camming feature is provided by a pointer element cam surface disposed on the pointer element that engages with a complementary footplate cam surface disposed on an element secured to the footplate.

24. A cutting tool in accordance with claim 23 further comprising a spring element that urges the pointer element cam surface into engagement with the footplate cam surface.

25. A cutting tool in accordance with claim 23 wherein the camming feature is provided by a generally tranversely extending axis pin which attaches the pointer element to the footplate for rotational movement, the axis pin including an eccentric section for providing the camming feature.

26. A cutting tool in accordance with claim 25 further comprising a leaf spring for engaging with the eccentric portion of the axis pin.

* * * * *